(12) United States Patent
Yuan (10) Patent No.: US 8,732,694 B2
(45) Date of Patent: May 20, 2014

(54) METHOD AND SYSTEM FOR PERFORMING SERVICES IN SERVER AND CLIENT OF CLIENT/SERVER ARCHITECTURE

(75) Inventor: Hao Yuan, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/259,220

(22) PCT Filed: Jun. 11, 2010

(86) PCT No.: PCT/CN2010/073834

§ 371 (c)(1),
(2), (4) Date: Feb. 24, 2012

(87) PCT Pub. No.: WO2011/023020

PCT Pub. Date: Mar. 3, 2011

(65) Prior Publication Data

US 2012/0144387 A1 Jun. 7, 2012

(30) Foreign Application Priority Data

Aug. 26, 2009 (CN) .......................... 2009 1 0167153

(51) Int. Cl.
*G06F 9/44* (2006.01)

(52) U.S. Cl.
USPC ............................ 717/176; 717/177; 717/178

(58) Field of Classification Search
None
See application file for complete search history.

(56) References Cited

U.S. PATENT DOCUMENTS

| | | | | |
|---|---|---|---|---|
| 5,761,380 A | * | 6/1998 | Lewis et al. | 717/177 |
| 5,950,010 A | * | 9/1999 | Hesse et al. | 717/178 |
| 6,018,725 A | * | 1/2000 | Boucher et al. | 717/174 |
| 6,198,946 B1 | * | 3/2001 | Shin et al. | H04M 1/72525 |
| 6,202,206 B1 | | 3/2001 | Dean et al. | |
| 6,301,707 B1 | * | 10/2001 | Carroll et al. | 717/177 |

(Continued)

FOREIGN PATENT DOCUMENTS

| | | |
|---|---|---|
| CN | 1598781 A | 3/2005 |
| CN | 101141303 A | 3/2008 |
| CN | 101635726 A | 1/2010 |

OTHER PUBLICATIONS

Enck, et al., "On Lightweight Mobile Phone Application Certification"; 2009 ACM; [retrieved on Nov. 13, 2013]; Retrieved from Internet <URL:http://dl.acm.org/citation.cfm?id=1653662>;pp. 235-245.*

(Continued)

*Primary Examiner* — Thuy Dao
*Assistant Examiner* — Xi D Chen
(74) *Attorney, Agent, or Firm* — Christopher L. Parmelee; Walker & Jocke (57) ABSTRACT

A method and system for performing services in a server and a client of a client/server architecture are provided, and the method includes: when performing to a preset user decision point during the service performing process, the server interrupting the service performing and initiating a user decision request to a client, wherein the user decision request includes information requesting the user to decide a service performing action after the user decision point; after a user decision information made by the client responding to the user decision request is received, determining the service performing action corresponding to the received user decision information according to the corresponding relationship between the user decision information and a service performing rule, and performing the service according to the determined service performing action. The service performing action or flow can be intervened or influenced by the client through the present invention.

9 Claims, 4 Drawing Sheets

```
when processing to a preset user decision point      S101
during performing the service, the server interrupts
the service performing and initiates a user decision
                     request

↓

After the user decision information is received,
  determining the corresponding service performing    S102
  action according to the service performing rule, and
  performing the service according to the determined
              service performing action
```

(56) References Cited

U.S. PATENT DOCUMENTS

| | | | |
|---|---|---|---|
| 6,324,691 B1* | 11/2001 | Gazdik | 717/178 |
| 6,493,871 B1* | 12/2002 | McGuire et al. | 717/178 |
| 6,606,744 B1* | 8/2003 | Mikurak | 717/178 |
| 6,633,871 B1* | 10/2003 | Jeyachandran et al. | 1/1 |
| 6,828,711 B2* | 12/2004 | Lilie | 717/178 |
| 6,854,016 B1* | 2/2005 | Kraenzel et al. | 709/229 |
| 6,918,112 B2* | 7/2005 | Bourke-Dunphy et al. | 717/177 |
| 6,954,930 B2* | 10/2005 | Drake et al. | 717/178 |
| 6,963,908 B1* | 11/2005 | Lynch et al. | 709/220 |
| 7,058,942 B2* | 6/2006 | Bourke-Dunphy et al. | 717/177 |
| 7,073,172 B2* | 7/2006 | Chamberlain | 717/176 |
| 7,185,334 B2* | 2/2007 | Bourke-Dunphy et al. | 717/176 |
| 7,430,736 B2* | 9/2008 | Nguyen et al. | 717/176 |
| 7,596,610 B2* | 9/2009 | Faisal et al. | 717/176 |
| 7,797,434 B2* | 9/2010 | Blakley et al. | 709/229 |
| 7,818,734 B2* | 10/2010 | Giannini et al. | 717/168 |
| 8,216,071 B2* | 7/2012 | Lee et al. | 463/42 |
| 2006/0123414 A1* | 6/2006 | Fors et al. | 717/177 |
| 2011/0041079 A1* | 2/2011 | Rive et al. | 717/176 |

OTHER PUBLICATIONS

Pickard, et al., "Rogue software: Protection against potentially unwanted applications"; 2012, IEEE; [retrieved on Nov. 13, 2013]; Retrieved from Internet <URL:http://ieeexplore.ieee.org/stamp/stamp.jsp?tp=&arnumber=6461001>;pp. 1-8.*

Sarma, et al., "Android Permissions: A Perspective Combining Risks and Benefits"; 2012 ACM; [retrieved on Nov. 13, 2013]; Retrieved from Internet <URL:http://dl.acm.org/citation.cfm?id=2295136>;pp. 13-23.*

See, et al., "User Acceptance towards a Peronalised Hands-free Messaging Application (iSay-SMS)"; 2010 IEEE; [retrieved on Nov. 13, 2013]; Retrieved from Internet <URL:http://ieeexplore.ieee.org/stamp/stamp.jsp?tp=&arnumber=5773709>;pp. 1165-1170.*

* cited by examiner

METHOD AND SYSTEM FOR PERFORMING SERVICES IN SERVER AND CLIENT OF CLIENT/SERVER ARCHITECTURE

FIELD OF THE INVENTION

The present invention relates to an inter-process communication technology in the communication and computer software field, and in particularly to a method and a system for performing services in a server and a client of the client/server (C/S) architecture.

BACKGROUND OF THE INVENTION

The C/S architecture is a well-known client and server architecture, which is structure of software systems.

Generally, in the C/S architecture, a method for performing services in a server and a client is: once started, the server should wait at any time to respond to the service performing request sent from the client; the client is responsible for interface display and user interaction. When the user needs to send to the server an operation request to perform services, the client sends to the server a service performing request according to the user request, and waits to receive the performing process information or the performing result information sent from the server. The server is responsible for receiving and performing the service performing request sent from the client, performs the services according to the service performing request, and returns the service performing result to the client after the service performing completed.

Generally speaking, during the service performing, according to the received service performing request, the client can not intervene in the service performing process of the server any more. Which, in usual case, doesn't influence the use of the C/S architecture to satisfy service demands of the client, but there is an exception. In some software demands, it is possibly required that the user may intervene in the service performing of the server via the client. For example, the user may hope to decide the subsequent service performing action or performing flow of the server according to different situations occurred after the server performs the services to a certain stage.

But, at present, during the service performing of the server, the client may not control the server.

SUMMARY OF THE INVENTION

One aspect of the present invention is to provide a method and system for performing the service in a server and a client of the C/S architecture, used to solve the problems that, in the existing technologies, the user can not intervene or influence the service performing action or performing flow of the server via the client in the C/S architecture.

Thereby, according to one aspect of the present invention, a method for performing services in a server of a C/S architecture is provided, comprising the following steps:

when performing to a preset user decision point during the service performing process, the server interrupting the service performing and initiating a user decision request to a client, wherein the user decision request includes information requesting the user to decide a service performing action after the user decision point;

after a user decision information made by the client responding to the user decision request is received, determining the service performing action corresponding to the received user decision information according to the corresponding relationship between the user decision information and a service performing rule, and performing the service according to the determined service performing action.

In another aspect, a method for performing services in a client of the C/S architecture is also provided, comprising the following steps:

receiving a service performing request from a user and sending it to a server, requesting the server to initiate service performing;

receiving information from the server during the service performing, if the information is a user decision request, indicating the user that a decision is needed and waiting for the user's response to the user decision request, wherein the user decision request comprises information for requesting the user to decide a subsequent service performing action;

receiving user decision information made by the user responding to the user decision request, the client sending the user decision information to the server.

In a further aspect, a system for performing services in a server and a client of a C/S architecture is also provided, the system comprises:

a service performing unit in the client, configured to initiate a service performing request to the server, when receive a user decision request from the server, to indicate the user that a decision is needed and to wait for the user's response to the user decision request, and to send user decision information made by the user responding to the user decision request to the server;

a service performing unit in the server, configured to start performing the services after receiving the service performing request from the client, when performing to a preset user decision point during performing the services, to interrupt the service performing and to initiate a user decision request to the client, after receiving user decision information made by the client responding to the user decision request, to determine a service performing action after the user decision point according to the user decision information.

With the present invention, setting a user decision point during the service performing flow of the server, a user may make decisions at the user decision point, and change the subsequent service performing action or flow according to the decisions. The purpose that the client intervenes or influences the service performing action or flow of the server is realized.

DETAILED DESCRIPTION OF THE EMBODIMENTS

The present invention will be described in detail hereinafter in conjunction with the drawings and the embodiments.

What needs to be explained is, if there is no conflict, the embodiments of the present invention and the characters in it can be combined with each other.

Figure 1:
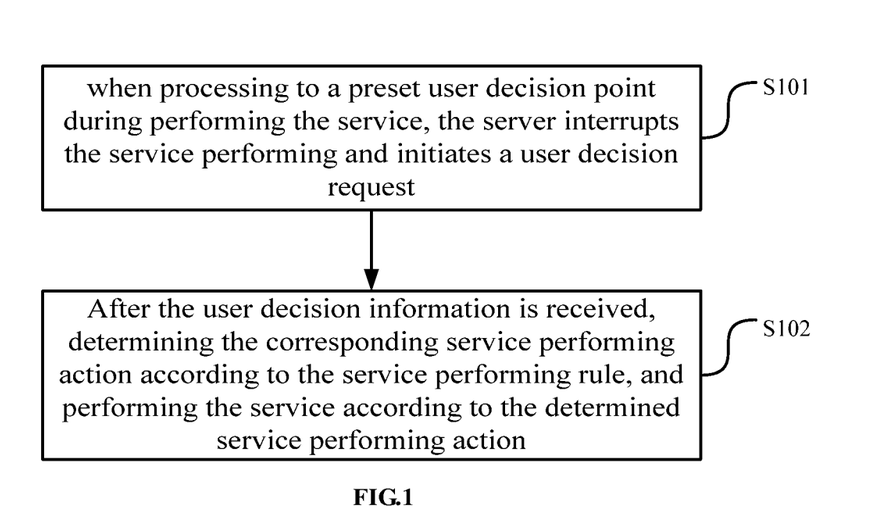
FIG. 1 is a flow chart of a method for performing services in a server of the C/S architecture according to an embodiment of the present invention.

The method for performing the service in a server of the C/S architecture provided by an embodiment of the present invention, as shown in FIG. 1, comprises the steps as follows: S101, when performing to a preset user decision point during the service performing, the server interrupts the service performing and initiates a user decision request to the client, wherein the user decision request comprises the information for requesting the user to decide the service performing action after the user decision point. S102, after the user decision information made by the client to the user decision request is received, the service performing action corresponding to the received user decision information is determined according to the corresponding relationship between the user decision information and the service performing rule, and the service is performed according to the determined service performing action.

Figure 2:
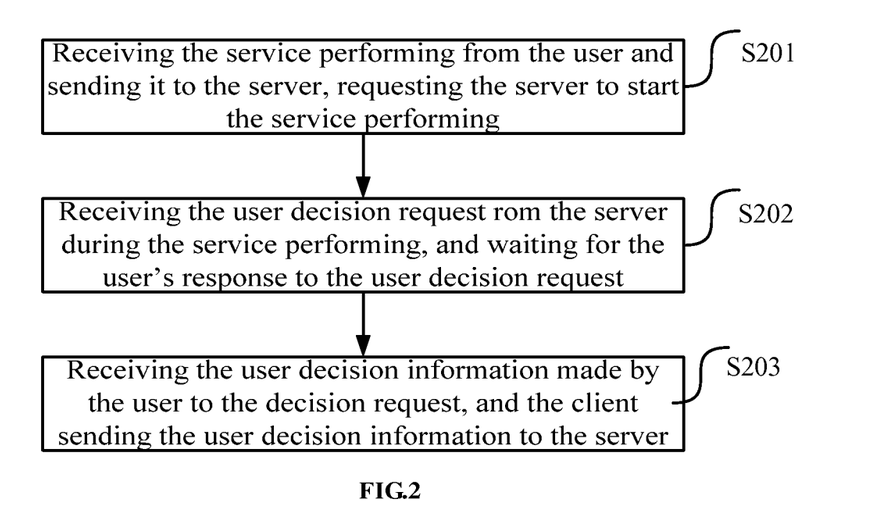
FIG. 2 is a flow chart of a method for performing services in a client of the C/S architecture according to an embodiment of the present invention.

FIG. 2 illustrates the method for performing the service in a client of the C/S architecture provided by an embodiment of the present invention, comprising the following steps: S201, receive the service performing request from the user and send it to the server, requesting the server to start the service performing. S202, receive the information from the server during the service performing, when the information is a user decision request, indicate the user to make decisions and wait for the user to respond to the user decision request, wherein the user decision request comprises the information for requesting the user to decide the subsequent service performing action. S203, the client receives the user decision information made by the user responding to the user decision request, and sends the user decision information to the server. With the adaption of the C/S architecture, the preferred client user's demands actively initiate a service performing request to the sever. After the server is started, uses the event loop to monitor the information from the client, and starts performing the service when the information is the service performing request, and returns the service performing status information to the client during performing the service from the start to the end. When the service performing status information from the server is received by the client, it is returned to the user via interface.

The system for performing the service in a server and a client of the C/S architecture provided by an embodiment of the present invention comprises: a service performing unit in a client, which is configured to initiate a service performing request to the server, indicate the user to make decisions and wait for the user to respond to a user decision request when the user decision request from the server is received, and send a user decision information made by the user to the user decision request to the server; a service performing unit in the server, which is configured to start performing the service after the service performing request from the client is received, interrupt the service performing and initiate a user decision request to the client when performing to a preset user decision point during performing the service, and after receiving the user decision information made by the client to the user decision request, determine the service performing action after the user decision point according to the user decision information.

Figure 3:
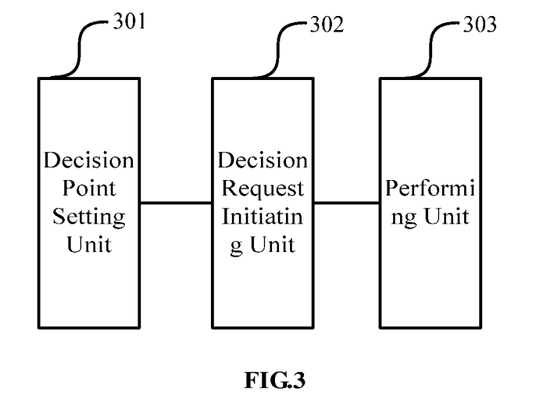
FIG. 3 is a structure diagram of the service performing unit in the server in the first embodiment of the present invention.
Figure 4:
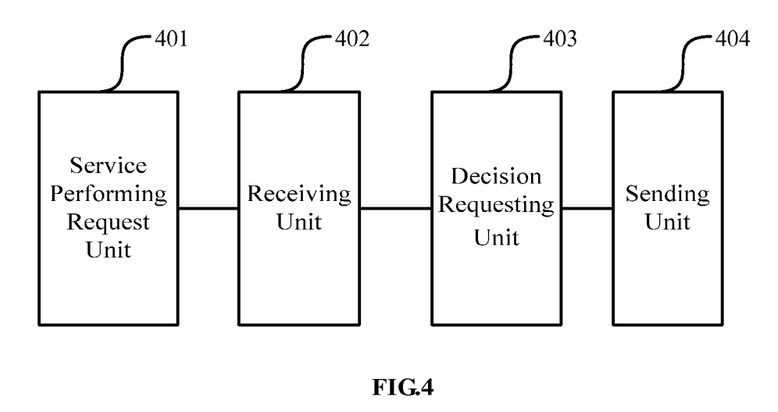
FIG. 4 is a structure diagram of the service performing unit in the client in the first embodiment of the present invention.

FIG. 3 shows a structure diagram of the service performing unit in the server in the present embodiment. The server service performing unit comprises the following units. A decision point setting unit 301 is configured to set the user decision point needed for the user to make decisions during the server performing the service. A decision request initiating unit 302 is configured to interrupt the service performing and initiate a user decision request to the client when performing to a preset user decision point during the service performing of the server, wherein the user decision request comprises the information for requesting the user to decide the service performing action after the user decision point. A performing unit 303 is configured to determine, after the user decision information made by the client to the user decision request is received, the service performing action corresponding to the received user decision information according to the corresponding relationship between the user decision information and the service performing rule, and perform the service according to the determined service performing action. FIG. 4 shows a structure diagram of the service performing unit in the client in the present embodiment, the service performing unit in the comprises the following units. A service performing request unit 401 is configured to initiate a service performing request to the server according to user's demands, which requesting the server to start performing the service. A receiving unit 402 is configured to receive information from the server during performing the service. A request decision unit 403 is configured to indicate the user to make decisions and wait for the user to respond to a user decision request when the received information is the user decision request. A sending unit 404 is configured to send the user decision information obtained after the user responds to the user decision request to the server.

Preferably, the user decision point can be set by the server according to the service performing condition or configured by the client. The mode which the user decision point is set by the server according to the service performing condition has a relatively high flexibility. For example the user decision point is set when a safety risk existing in performing the service is detected, which request the user to decide whether the subsequent service is performed or not. The mode which the user decision point of the service performing flow is configured by the client can better meet the user's demands but with less flexibility. The user decision request may comprise several different mark-bit information which requesting the user to make decisions, wherein different mark-bit information corresponds to different service performing action in the service performing rule. The user decision information is one of the chosen mark-bit information. Accordingly, the server may decide the service performing action by the service performing rule after the user decision point according to the received mark-bit information and perform the service performing action. Of course, the user decision request is not limited to the above-mentioned forms, it can be any other forms that transmits the request to the user to decide the subsequent service performing action. The method and system provided by the embodiment of the present invention is suitable for the C/S architecture. The embodiment of the present invention is suitable for the network system with the C/S architecture and the software system with the C/S architecture.

According to the first embodiment of the present invention, in the method for performing the service in a client and a server of the C/S architecture, the server and the client adapt different types of information in the program to represent the service performing request, the user decision information, the service performing status information and the user decision request.

During the client and the server performing the service, the messages sent from the client to the server are categorized, which comprises the following types. A1, a service performing request message, which indicates the service performing request, that is the user hopes the server to perform what kind of service. A2, a user decision message, which indicates the user decision information, that is the user's response to the user decision request sent from the server.

The messages sent from the server to the client are also categorized, which comprises the following types. B1, a service performing status message, which indicates the service performing status information, that is, indicates the feedback of the service performing result or the intermediate information from the server performing the service according to the service performing request sent from the user, which may feedback whether the service performing request of the user is performed successfully or not or what stages it processed to. The service performing status message also can be categorized as a indicating message, a warning message, an error message, a progress message and an event response message corresponding to different service performing request. B2, a user decision request message indicates the user decision request, that is, indicates the user is needed to decide the subsequent service performing action or flow when the server processes to the preset user decision point.

In the present embodiment, the different types of message described above are transmitted between the client and the server via a message channel, wherein the message channel may be socket, pipe, message queue or other inter-process communication carrier.

The so-called socket (also called just "socket"), used to describe an IP address and a port, is a handler of the communication link. The application usually sends a request to the network or responds to the network request via the "socket". The client applies to a random socket, the network system distributes a socket number (hereinafter referred to as client-sock) to the client, and the server has the socket acknowledged all across the local area network (hereinafter referred to as server-sock), any client may send to the server a connection request and an information request. In particular, the server uses a server-sock to monitor the specified port, the port may be specified in a random, waits for a connection request form the client, generates a session after connecting with the client, and closes the connection after the session is finished. The client uses a client-sock to send a connection request to the port of the server in the network, opens the session when connected successfully, and closes the client-sock after the session is finished.

The pipe is used as a shared memory region in the inter-process communication. A process writes the information into the pipe while another process reads the information from the pipe.

The message is the data unit transmitted between two computers. The message is sent to the queue. The message queue is a container storing messages during its transmission progress, wherein the main purpose of the message queue is to provide routing and to ensure the transmission of the message.

In the present embodiment, the message structure sent from the client to the server and that from the server to the client can be defined independently or unified in one structure.

The server and the client of the present embodiment use the event loop to monitor the message in the program. The client uses the third event loop to monitor the message representing the service performing request and the message representing the user decision information from the user, that is, the third event loop monitors the user event in the interface of the client. The fourth event loop is used to monitor the message representing the user decision request and the message representing the service performing status information from the server, that is, the fourth event loop is used to monitor the message channel. In the present embodiment, the forth event loop used for the client to monitor the message channel is called CL1. Since the event loop of the client monitors the interface user event and the message channel, with regards to the integrating of the third event loop and the forth event loop, the present embodiment uses the third event loop as the main event loop and adapts a monitoring means of event drive, the forth event loop adapts the means of timing query.

In the server, the first event loop is used to monitor the message indicating the service performing request from the client. In the present embodiment the message channel monitoring of the server is called SL1. According to the different received service performing request message, the server calls different manipulation function and performs different service action or flow. The second event loop is used to monitor the message indicating the user decision information from the client, and this monitoring of the server is called SL2 in the present embodiment. In the method for performing the service in a server and a client of C/S architecture, SL1 monitors the message channel between the server and the client continually and circularly.

The server starts performing the service when monitoring the message indicating the service performing request. When performing to the user decision point during performing the service, the server finds that the user is needed to make decisions, interrupts to perform the service and initiates an user decision request message to the client, and waits for the client to respond to the user decision request, meanwhile the server blocks the event loop SL1 and starts the event loop SL2 to monitor the massage channel. After the client monitors the user decision request message from the server with the forth event loop, it pops up a query interface and waits for the user to respond. When the third event loop of the client traps the user response (user decision message), the client sends the user decision message to the serve via the message channel. After the event loop SL2 of the server monitors the user decision message, according to the user decision information, the server performs related service by the above-mentioned rules, withdraws from the event loop SL2 and disposes it, and recovers the event loop SL1. The server waits for the service performing request message sent from the client.

In the present embodiment, the event loop SL1 or SL2 loop of the server in principle may receive all the messages sent from the client to the server via the message channel. But herein, the event loop SL1 is designed only for receiving the service performing request message. If the user decision message is received by the event loop SL1, it is discarded directly. The event loop exists till the server process is terminated. In the present embodiment, the event loop SL2 is designed only for receiving the user decision message. If the service performing request message is received by the event loop SL2, it is discarded directly. The event loop SL2 will be withdrew and disposed after the server receives the user decision message.

A user can intervene or influence the service performing action or flow of the server through the client according to the method of the present embodiment. During performing the service according to the service performing request, when performing to the user decision point, the server sends a user decision request message to the client, and meanwhile starts an event loop at the user decision point, monitors the message channel, and waits for the user decision message, so that the client intervening or influencing the service performing action or flow of the server is realized.

The above mentioned method of the present embodiment is not limited to the operating system platform or the operating environment, and as long as the operating system supports the inter-process communication, this method is suitable. It is not limited to the one-to-one C/S architecture either and it is also suitable for extensible multiple-to-one architecture that the server starts different threading for service performing requests of different clients at the server.

According to the second embodiment of the present invention, in the method for performing services of the client and the server in the C/S architecture, taking the software package installation service performing on the Linux platform smart phone for example, all the software packages are placed in a network server with a configuration file indicating the related information of all software including name, version number and MD5 (Message-digest Algorithm 5) value etc. of the software, and the package management program of the mobile phone terminal will download the configuration file to obtain all software package information. The package management program of the mobile phone terminal is based on the C/S architecture, the client graphical interface is based on the gtk+ development kit, the server uses C language, and socket is selected as the message channel carrier between the client and the server. The client and the server use one-to-one mode, but those skilled in the art should appreciate that the present invention is not limited to the service performing with above mentioned features and the C/S architecture is not limited to one-to-one mode. The message channel carrier is not limited to socket either.

The above mentioned MD5, which is used to ensure information transmission, is most widely used in password confirming and key identifying of all kinds of software. Generally speaking, the mentioned sequence numbers are complete and consistent. Usually, in the software information at some software downloading sites, MD5 value is often encountered, the function of which is to conduct a MD5 check of the downloaded file by using a special software (for example, Windows MD5 Check) after the software has been downloaded, so as to ensure the obtained file is the same one with the file provided by the site.

Figure 5:
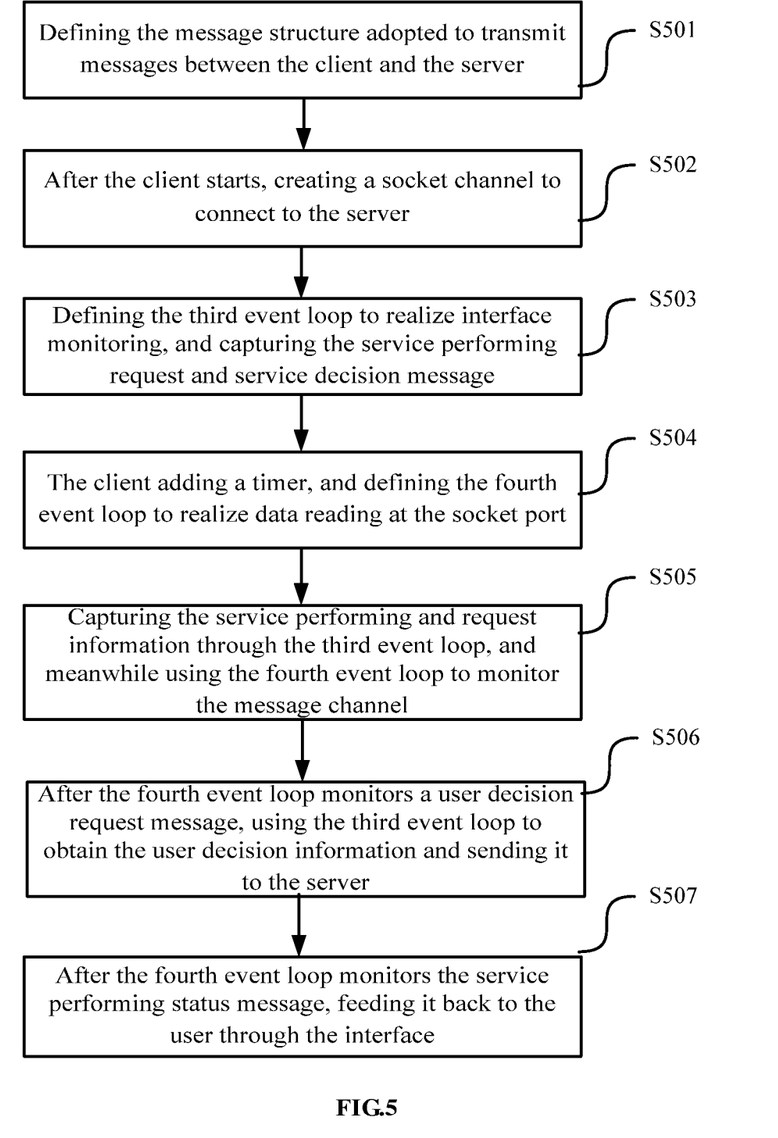
FIG. 5 is a flow chart of a method for performing services in a client of the C/S architecture in the second embodiment of the present invention.

As shown in FIG. 5, the method of performing the service in a client of the C/S architecture of the present embodiment comprises the following steps (S501-S507).

S501: Define the message structure adopted to transmit messages between the client and the server.

In the present embodiment, the message sent from the client to the server and the message sent the server to the client use the principle of identical structures, which is Message_t with the program as follows:

```
typedef struct
{
    Type_t type;
    Context_t content;
}Message_t.
```

There are two member variables in this structure, in which, type is an enumeration variable indicating categorization of the message, specifically, indicating the service performing request message and the user decision message when the client sends a message to the server, and indicating the user decision request message and the service performing status message etc. when the server sends a message to the client. Content is a structure, indicating the details carried in the message.

S502: After starts, the client creates a socket channel, obtains the client_sock, and connects the client_sock to the server, thereby a message channel between the client and the server is established.

S503: Define the third event loop to realize the interface monitoring, therefore the client can obtain the user action (i.e. capture the service performing request message and the user decision message) by monitoring the third event loop of the interface, and send it to the server.

S504: The client adds a timer, defines and uses the fourth event loop, which uses the timing reading method, to realize data reading on the socket port, and monitors the fourth event loop of the message channel, specifically using the timing reading method, and the sample code is:

gtk_timeout_add (500, get_pending_message, NULL),

The function of the get_pending_message function is to read the message (including the user decision request message and the service performing status message) on the socket sent from the server, and call different handling function according to the message categorization, for example, after monitoring the user decision request message, pop up an interface requesting the user to make a decision, and when monitoring the service performing status message, return it to the user through the interface.

S505: Based on the above mentioned Steps, when the user of the client has some specific demand, first seize the service performing request information through the third event loop and sends the service performing request information to the network server. At this time, the network server as the server, and the mobile phone as the client, use the fourth event loop to monitor the message channel. For the service performing request being a message of requesting installation in the present embodiment, when the user selects a software package in the mobile phone and requests the network server to install it, the mobile phone sends the message of requesting installation to the network server. After receiving this request, the network server downloads the software package to the local (i.e. the mobile phone) and begins to install. Since the package management program of the mobile phone terminal is based on the C/S architecture, the user interface is the client and the package installation program of the backstage is the server during the installation of the software package.

S506: After the fourth event loop monitors a user decision request message, pop up a dialog box or textual interface requesting the user to decide, and after use the third event loop obtain a user decision message sends the user decision message to the server.

S507: After the fourth event loop monitors the service performing status message, return it to the user through the interface. Such as return the service performing result of downloading succeeded or downloading failed to the user.

Figure 6:
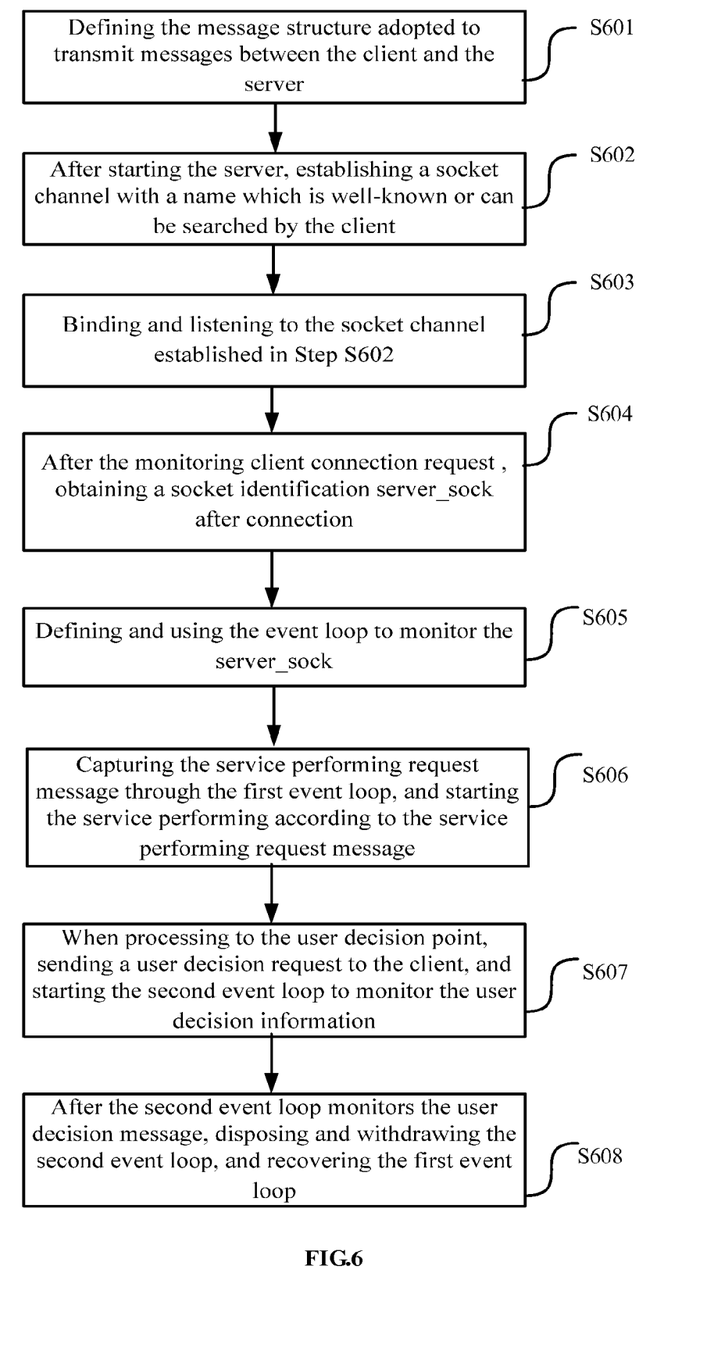
FIG. 6 is a flow chart of a method for performing services in a server of the C/S architecture in the second embodiment of the present invention.

As shown in FIG. 6, the method of performing service in a server of the C/S architecture of the present embodiment comprises the following steps (S601-S608).

S601: Define the message structure adopted to transmit messages between the client and the server. In the present embodiment, the message sent from the client to the server and the message sent from the server to the client use the principle of identical structures, which is Message_t, specifically being the same to the above mentioned description in S501.

S602: After starts, the server creates a socket channel with a name which is well-known or can be searched by the client.

S603: Bind and listen to the socket channel established in S602.

S604: After monitor a connection request from the client, obtain a socket identification server_sock after connect.

S605: Define that use a event loop to monitor the server_sock, herein, the sample code of the event loop is realized through a while (wait_message( )) loop, and the function of the wait_message message function is to read the message on the socket from the client and to call different handling function according to the message categorization. herein, specifically define the first event loop to monitor the service performing request message from the client and define the second event loop to monitor the user decision message from the client.

S606: Based on the above mentioned steps, when the user of the client has some specific demands, first seize the service performing request message through the first event loop and start the service performing according to the service performing request message. If the mobile phone is the client and the network server is the server before installation of the software package, and after receiving the installation request message from the mobile phone, the network server starts performing the service of downloading this software package from the network server to the local, and starts the installation after the downloading is completed. Since the package management program of the mobile phone terminal is based on the C/S structure, the user interface is the client and the package installation program of the backstage is the server during the installation of the software package.

S607: Interrupt the service performing when performing to the user decision point, i.e. hang up the first event loop, send a user decision request to the client and start the second event loop to monitor the user decision information from the client. For example, after downloading the software package from the network server to the local and starting the installation, the package installation program of the backstage, as a server, will check whether the MD5 value of the software package agrees with that of the configuration file in the network server, and if yes, it means that the package is not altered by a third party, and can be installed safely, or else, it means that the software package is altered by a third party, which has safety risks. At this time the service performing of the server needs the user to decide, and the server sends a user decision request message to the client, meanwhile herein, calls the wait_message function, starts the second event loop and waits for the user's response. The server in the present embodiment checks the safety of the software package installation according to the service performing condition. If there are safety risks, set the user decision point to interrupt the service and request the user to decide whether to install. If there is no risk, do not set the user decision point to interrupt the service and conduct the installation directly. The user decision request in the present embodiment comprises two different mark-bit information which request the user to make a choice, wherein, one of the mark-bit information corresponds to the service performing action of going on with the software package installation in the service performing rule, and the other mark-bit information corresponds to the service performing action of not conducting the software package installation in the service performing rule.

S608: When the second event loop monitors data on the server_scok, read the data and translate it into the Message_t message structure, and analyze the message contents to obtain user decision information. The user decision information in the present embodiment is selected mark-bit information. The server determines the subsequent service performing action according to the received user decision, withdraws from the second event loop and returns to the first event loop again. Hereto, the flow of the client intervening the performing of the server ends. When the client is required to intervene the performing of the server again, repeat S607 and S608.

During the service performing, the server can return the service performing status information to the client.

Obviously, those skilled in the art can make various modifications and alterations of the present invention without departing from the spirit and scope of the present invention. Thus, if these modifications and alterations of the present invention belong to the scope of the claims of the present invention and other equivalent technologies, the present invention is meant to include in these modifications and alterations.

What is claimed is:

1. A method for performing services in a server of a client/server architecture, comprising:

when performing to a preset user decision point during the service performing process, the server interrupting the service performing and initiating a user decision request to a client, wherein the user decision request includes information requesting the user to decide a service performing action after the user decision point; and after a user decision information made by the client responding to the user decision request is received, determining the service performing action corresponding to the received user decision information according to the corresponding relationship between the user decision information and a service performing rule, and performing the service according to the determined service performing action;

wherein the communications between the client and the server are via a message channel which is an inter-process communication carrier and comprises a socket, a pipe or a message queue; and wherein the method is applied in a software package installation of the client/server (C/S) architecture in a mobile phone, and a user interface is the client while a software package installation program of a backstage is the server during the installation of the software package;

the server detects the safety of the software package installation according to the service performing conditions during the software package installation, and if there are safety risks, sets a user decision point to interrupt the service performing and sends a user decision request to the client, the client indicates the user to decide whether to install, and the server determines whether to go on with the software package installation after receiving the user decision information of whether to install from the client; and wherein the user decision request comprises different mark-bit information for requesting a user to make a choice, wherein different mark-bit information corresponding to different service performing actions in the service performing rule;

the user decision information is chosen mark-bit information.

2. The method according to claim 1, wherein, the user decision point is set by the server according to service performing conditions or configured by the client.

3. The method according to claim 1, wherein, the user decision point is set by the server according to service performing conditions or configured by the client.

4. A method for performing services in a client of a client/server architecture, comprising:

receiving a service performing request from a user and sending it to a server, requesting the server to initiate service performing;

receiving information from the server during the service performing, if the information is a user decision request, indicating the user that a decision is needed and waiting for the user's response to the user decision request, wherein the user decision request comprises information for requesting the user to decide a subsequent service performing action; and receiving user decision information made by the user responding to the user decision request, the client sending the user decision information to the server;

wherein the communications between the client and the server are via a message channel which is an inter-process communication carrier and comprises a socket, a pipe or a message queue; and wherein the method is applied in a software package installation of the C/S architecture in a mobile phone, and a user interface is the client while a software package installation program of a backstage is the server during the installation of the software package;

during the software package installation, after the client receives a user decision request sent by the server for detecting safety risks, the client indicates that the user needs to decide whether to go on with the software package installation, waits for user decision information made by the user, and sends the user decision information to the server; and wherein the user decision request comprises different mark-bit information for requesting a user to make a choice, wherein different mark-bit information corresponding to different service performing actions in the service performing rule;

the user decision information is chosen mark-bit information.

5. A system for performing services in a server and a client of a client/server architecture, comprising:

a processor configured to execute program units stored on a memory, wherein the program units comprises:

a service performing unit in the client, configured to initiate a service performing request to the server, when receive a user decision request from the server, to indicate the user that a decision is needed and to wait for the user's response to the user decision request, and to send user decision information made by the user responding to the user decision request to the server; and a service performing unit in the server, configured to start performing the services after receiving the service performing request from the client, when performing to a preset user decision point during performing the services, to interrupt the service performing and to initiate a user decision request to the client, after receiving user decision information made by the client responding to the user decision request, to determine a service performing action after the user decision point according to the user decision information;

wherein the communications between the client and the server are via a message channel which is an inter-process communication carrier and comprises a socket, a pipe or a message queue; and wherein the system is applied in a software package installation of the Client/Server architecture in a mobile phone, and a user interface is the client and a software package installation program of a backstage is the server during the installation of the software package;

the service performing unit in the server detects the safety of the software package installation according to service performing conditions during the software package installation, and if there are safety risks, sets a user decision point to interrupt the service performing and sends a user decision request to the client, the client indicates the user to decide whether to install, and the server determines whether to go on with the software package installation after receiving the user decision information of whether to install from the client;

the service performing unit in the client, after receiving the user decision request sent by the server for detecting safety risks, indicates that the user needs to decide whether to go on with the software package installation and waits for the user decision information made by the user, and sends the user decision information to the server; and wherein the user decision request comprises different mark-bit information for requesting a user to make a choice, wherein different mark-bit information corresponding to different service performing actions in the service performing rule;

the user decision information is chosen mark-bit information.

6. The system of claim 5, wherein, the service performing unit in the server comprises:

a decision point setting unit, configured to set the user decision point needed for a user to make decisions during the service performing of the server;

a decision request initiating unit, configured to interrupt the service performing and to initiate a user decision request to the client when the server processes to the preset user decision point during the service performing, wherein the user decision request includes information for requesting the user to decide a service performing action after the user decision point;

a performing unit, configured to determine the service performing action corresponding to the received user decision information according to the corresponding relationship between user decision information and a service performing rule after the user decision information made by the client responding to the user decision request is received, and to perform the services according to the determined service performing action.

7. The system of claim 5, wherein, the service performing unit in the client comprises:

a service performing request unit, configured to initiate a service performing request to the server according to user's demands, and to request the server to start the service performing;

a receiving unit, configured to receive information from the server during the service performing;

a decision requesting unit, configured to indicate the user that a decision is needed and to wait for the user's response to the user decision request when the received information is the user decision request, wherein the user decision request comprises information for requesting the user to decide the subsequent service performing action;

a sending unit, configured to send the user decision information made by the user responding to the user decision request to the server.

8. The system of claim 6, wherein, the decision point setting unit comprises a setting unit in the server and a setting unit the client, the setting unit in the server, configured to set the user decision point by the server in the service performing flow according to service performing conditions;

the setting unit in the client, configured to set the user decision point by the client in the service performing flow.

9. The system of claim 6, wherein, the service performing unit in the client comprises:

a service performing request unit, configured to initiate a service performing request to the server according to user's demands, and to request the server to start the service performing;

a receiving unit, configured to receive information from the server during the service performing;

a decision requesting unit, configured to indicate the user that a decision is needed and to wait for the user's response to the user decision request when the received information is the user decision request, wherein the user decision request comprises information for requesting the user to decide the subsequent service performing action;

a sending unit, configured to send the user decision information made by the user responding to the user decision request to the server.

* * * * *